Dec. 7, 1948.　　　M. B. MARTIN　　　2,455,432
TRACTOR TIRE LIFT

Filed Feb. 7, 1947　　　2 Sheets-Sheet 1

INVENTOR.
MELVIN B. MARTIN,
BY
*McMorrow, Berman & Davidson*
ATTORNEYS.

INVENTOR.
MELVIN B. MARTIN,

Patented Dec. 7, 1948

2,455,432

UNITED STATES PATENT OFFICE 2,455,432

TRACTOR TIRE LIFT

Melvin B. Martin, Piqua, Ohio

Application February 7, 1947, Serial No. 727,084

4 Claims. (Cl. 214—113)

My invention relates to tire lifts, and more particularly to lifts adapted to lift fluid-filled tractor tires.

The object of my invention is to provide a tractor tire lift adapted to be removably mounted on a small service truck, so that the truck can be backed up to the tractor and the tractor wheel equipped with the tire to be serviced can be run onto the lift, and after the lugs on the tractor have been loosened, can be lifted and taken to a garage for servicing.

Another object of my invention is to provide a tractor tire lift adapted to be removably secured to different makes of trucks by means of adapters of different styles.

Other objects of my invention may appear in the following specification describing it with reference to the accompanying drawings illustrating a preferred embodiment of my invention.

It is, however, to be understood that my invention is not to be limited and restricted to the exact construction and combination of parts described in the specification and shown in the drawings, but that such changes and modifications can be made which fall within the scope of the claims appended hereto.

Figure 1:
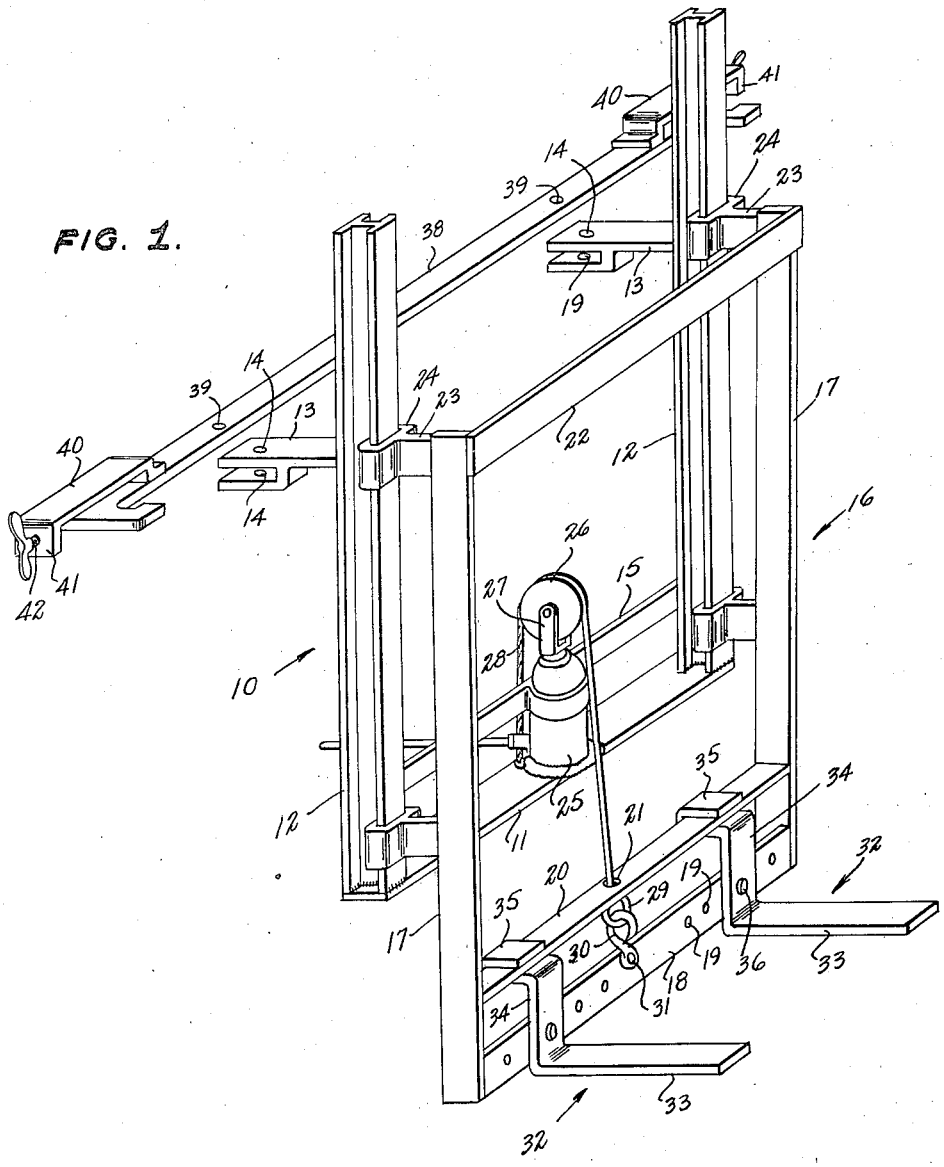
Figure 1 is a perspective view of a tractor tire lift according to my invention, an adapter being shown by means of which the lift can be removably hitched to a jeep.
Figure 2:
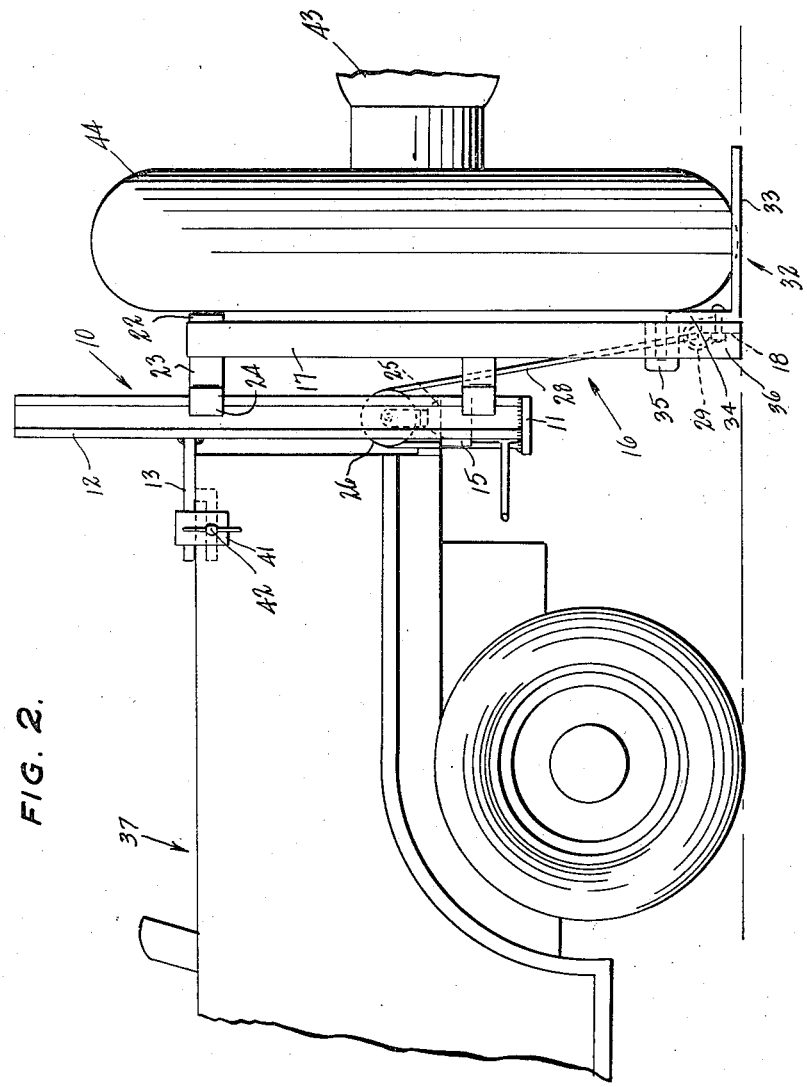
Figure 2 is a fragmentary elevational side view of a jeep truck equipped with a tire lift according to my invention, a tractor wheel equipped with a tire being shown in position on the lift.

Referring now in detail to the drawings, the tire lift forming the subject matter of my invention comprises a main frame 10 having a bottom bar 11. At each end of the bottom bar 11 an eye beam 12 is secured by welding or the like, so that it stands upright on one of its ends.

To each of the eye beams 12 an h-shaped fastening member 13 is secured by welding or the like, so that the long bar of the h abuts the corresponding beams at a distance from the top end of the beam and that the long and the short bars of each fastening member extend at right angles forwardly to the corresponding eye beam 12.

Coaxial holes 14 are provided in the long and short bars of each fastening member 13.

A flat stiffening bar 15 is secured to the front surfaces of the two eye beams 12 at a distance above the bottom bar 11 and parallel thereto.

A lifting frame 16 comprises two vertically arranged flat side bars 17 which are positioned so that their inner flat surfaces face each other.

A lifting bar 18 is secured to these side bars 17 by welding or the like at the front edges of the side bars so that the lifting bar 18 stands on edge and the lower edge of this bar is arranged in the same plane with the lower end edges of the side bars 17.

Symmetrically from the vertical center line of the lifting bar 18 a plurality of holes 19 is arranged for a purpose to be described later.

At a distance above the lifting bar 18 a slide bar 20 extends between and is secured to the vertical side bars 17. The slide bar is arranged so that its flat surfaces are positioned horizontally and that it runs parallel to the lifting bar 18. In the center of the sliding bar 20 a hole 21 is provided.

An upper stiffening bar 22 is received by welding or the like to the upper ends of the rear edges of the side bars 17.

Just below the top end of each side bar 17 a forwardly extending short neck bar 23 is secured to the front edge of each side bar 17 and on the front end of each neck bar 23 a C-shaped guide member 24 is formed integrally therewith.

At a distance below the neck bar 23 a second short neck bar 23 is secured to the front edge of each side bar 17 and extends forwardly therefrom. On the front end of each second neck bar 23 a C-shaped guide member 24 is formed integrally therewith.

The C-shaped guide members 24 are adapted to engage the rear flanges of the eye beams 12 slidably.

A manually operable jack 25 is securely mounted on the bottom bar 11 of the main frame 10 and is arranged centrally thereon.

A sheave 26 is rotatably mounted in the bifurcated upper end 27 of the ram of the jack 25.

One end of a rope or cable 28 is firmly secured to the bottom bar 11 of the main frame 10. The cable 28 is trained over the sheave 26 and extends downwardly through the hole 21 in the slide bar 20. To the free end of the cable 28 under the slide bar 20 a lifting ring 29 is securely fastened, which engages a shackle 30. A bolt or rivet 31 extends centrally through the lifting bar 18 and the shackle 30 is secured to this bolt 31.

Two lifting arms 32 are formed from flat bar material. Each lifting arm comprises a rearwardly extending base portion 33 on the front end whereof an upwardly extending intermediate portion 34 is formed at right angles to the base portion 33.

At the upper end of the intermediate portion 34 each lifting arm 32 is bent forwardly at right angles to the intermediate portion 34 and then rearwardly again to form an open guideway 35 adapted to receive the slide bar 20 therein, so that the lifting arms can be adjusted slidably on said bar.

An adjusting bolt 36 extends through the intermediate lifting arm portion 34 so that it can be arranged selectively in any one of the holes 19 in the lifting bar 18.

In order to attach the above-described tire lift to the rear end of a truck 37 or the like, an adjuster bar 38 is provided adapted to be engaged by the h-shaped fastening members 13 so that the adjuster bar 38 is located between the long and the short bars of the fastening members 13. Holes 39 are provided in the adjuster bar 38 so that they are coaxial with the holes 14 in the short and long bar of each fastening member 13 and are adapted to be engaged by a pin or the like (not shown) extending through said holes.

It is to be understood that the adjuster bar 38 has to be built especially to fit certain makes of trucks. In general, however, the adjuster bar 38 is constructed so that it is adapted to be attached securely but removably to the rear of the body of a truck or the like.

To fit the adjuster bar 38 onto a jeep an end bar 40 is welded onto the top surface of the adjuster bar 38 adjacent each end thereof and is formed so that it extends parallel to the adjuster bar at a distance above the same.

The outer end of each end bar 40 extends beyond the end of the adjuster bar and is bent downwardly at right angles to the main end bar portion forming a clamp plate 41 through which a clamp bolt 42 provided with a wing head extends threadedly so that these clamp bolts are adapted to engage the jeep body and secure the adjuster bar 38 removably thereon.

When the tire lift is secured to the truck 37, it is backed up to the tractor 43 equipped with the tire 44 to be serviced. The lifting frame 16 is lowered until the lift arms 32 touch the ground. The tractor is moved so that the tire to be serviced is on top of the base lifting arm portions 33. The lugs of the tractor wheel are loosened and the lifting frame is raised supporting the tire to be serviced.

In this manner fluid-filled tires can easily be transported from the middle of a plowed field to a garage or the like to be serviced there and can just as easily be returned to the tractor after being serviced.

Since the tire lift is removable, the truck can be used for other purposes between calls for tractor tire service.

The lifting arms 32 can be adjusted relatively to each other to fit any given size of tire by removing the adjusting bolts 36, sliding the lifting arms 32 on the slide bar 20 into the desired position and securing them in this position by inserting the adjusting bolts in the selected holes 19.

Having described my invention, I claim as new and desire to secure by Letters Patent:

1. A tire lift including a main frame and a lifting frame slidably supported by the main frame, the main frame comprising a bottom bar, a pair of eye beams secured to and extending upwardly from the ends of the bottom bar, and a stiffener bar secured to both eye beams, the lifting frame comprising C-shaped guide members slidably engaging the rear flanges of the eye beams of the main frame, two side bars to which the C-shaped guide members are secured, a top stiffener bar secured to the top ends of the side bars, a lifting bar secured to the lower ends of the side bars and a slide bar secured to the side bars at a distance above the lifting bar, a jack securely mounted on the bottom bar of the main frame, a sheave rotatably mounted in the bifurcated upper end of the ram of the jack, a cable trained over the sheave, one end of the cable secured to the bottom bar of the main frame and the other cable end secured to the lifting bar, and a pair of angular lifting arms having open guideways formed on its upwardly extending portions adapted to engage the slide bar slidably, the rearwardly extending portions being adapted to receive and support tires thereon.

2. A tire lift including a main frame and a lifting frame slidably supported by the main frame, the main frame comprising a bottom bar, a pair of eye beams secured to and extending upwardly from the ends of the bottom bar, and a stiffener bar secured to both eye beams, the lifting frame comprising C-shaped guide members slidably engaging the rear flanges of the eye beams of the main frame, two side bars to which the C-shaped guide members are secured, a top stiffener bar secured to the top ends of the side bars, a lifting bar secured to the lower ends of the side bars and a slide bar secured to the side bars at a distance above the lifting bar, a jack securely mounted on the bottom bar of the main frame, a sheave rotatably mounted in the bifurcated upper end of the ram of the jack, a cable trained over the sheave, one end of the cable secured to the bottom bar of the main frame and the other cable end secured to the lifting bar, and a pair of angular lifting arms having open guideways formed on its upwardly extending portions adapted to engage the slide bar slidably, the rearwardly extending portions being adapted to receive and support tires thereon, said arms being adapted to be secured in adjusted position relative to each other by bolts adapted to extend through holes provided in the upwardly extending arm portion and to engage seletcively holes of a plurality of holes provided in the lifting bar.

3. A tire lift including a main frame and a lifting frame slidably supported by the main frame, the main frame comprising a bottom bar, a pair of eye beams secured to and extending upwardly from the ends of the bottom bar, and a stiffener bar secured to both eye beams, the lifting frame comprising C-shaped guide members slidably engaging the rear flanges of the eye beams of the main frame, an adjuster bar for supporting said main frame, and means for securing the main frame to the adjuster bar, said means comprising an h-shaped fastening member extending horizontally and forwardly from the front flange of each eye beam, each h-shaped fastening member comprising integral spaced long and short bars adapted to receive the adjuster bar therebetween.

4. A tire lift including a main frame and a lifting frame slidably supported by the main frame, the main frame comprising a bottom bar, a pair of eye beams secured to and extending upwardly from the ends of the bottom bar, and a stiffener bar secured to both eye beams, the lifting frame comprising C-shaped guide members slidably engaging the rear flanges of the eye beams of the main frame, two side bars to which the C-shaped guide members are secured, a top stiffener bar secured to the top ends of the side bars, a lifting bar secured to the lower ends of the side bars and a slide bar secured to the side bars at a distance above the lifting bar, a jack securely mounted on the bottom bar of the main frame, a sheave rotatably mounted in the bifurcated upper end of the ram of the jack, a cable trained over the sheave, one end of the cable secured to the bottom bar of the main frame and the other cable end secured to the lifting bar, a pair of angular lifting arms having open guideways formed on its upwardly extending portions adapted to engage the slide bar slidably, the rearwardly extending portions being adapted to receive and support tires thereon, an adjuster bar for supporting said tire lift, and means for securing the main frame to the adjuster bar, said means comprising an h-shaped fastening member extending horizontally and forwardly from the front flange of each eye beam, each h-shaped fastening member comprising integral spaced long and short bars adapted to receive the adapter bar therebetween.

MELVIN B. MARTIN.

REFERENCES CITED

The following references are of record in the file of this patent:

UNITED STATES PATENTS

| Number | Name | Date |
|---|---|---|
| 1,416,958 | Kelley et al. | May 23, 1922 |
| 1,731,204 | Recchia | Oct. 8, 1929 |
| 1,964,119 | Hendry | June 26, 1934 |
| 2,110,239 | Richter | Mar. 8, 1938 |
| 2,210,323 | Lambert | Aug. 6, 1940 |
| 2,231,875 | Behnke et al. | Feb. 18, 1941 |
| 2,419,813 | Berchtold | Apr. 29, 1947 |